3,773,720
POLYARYLSULFONES
Herward A. Vogel, North St. Paul, Minn., assignor to Minnesota Mining and Manufacturing Company, St. Paul, Minn.
No Drawing. Filed May 13, 1963, Ser. No. 280,088
Int. Cl. C08g 33/10
U.S. Cl. 260—49                    9 Claims This invention relates to thermoplastic polymers and to processes for preparing same. More particularly, the invention is concerned with certain high molecular weight condensation polymers comprising polyarylsulfones which are characterized by a high degree of thermal and chemical stability.

Polyphenylsulfones have been reported heretofore, as by Weil, Compt. Rend. 254, 3674 (1962), and as described by Kreuchunas in U.S. Pat. No. 2,822,351. However, these have been either insoluble or low molecular weight materials which were not suitable for the production of shaped articles; or have been of little practical use because they have been susceptible to chemical oxidation and the like. Moreover, the heretofore available processes have failed to permt the preparation of polymers of this type which form films or filaments of good physical properties.

It has now been found that certain high molecular weight, film-forming polyaryl sulfones can be produced from aromatic disulfonylchlorides by condensation with aromatic hydrocarbons, or by self condensation of certain aromatic monosulfonyl chlorides. While it was known in the art that the interaction of a sulfonyl halide with an aromatic hydrocarbon in the presence of a Friedel-Crafts catalyst results in the formation of an aromatic sulfone, I believe I am the first to have prepared the novel high molecular weight film and fiber-forming polymers of this invention.

It is an object of this invention to provide certain novel high molecular weight condensation polymers which are wholly aromatic in character and which contain certain aromatic sulfone groups in the recurring units of the polymeric chain.

It is another object of this invention to provide soluble, thermoplastic materials comprising polyarylsulfones which are characterized by a high level of thermal and chemical stability, and by their useful solubility and tough film-forming properties.

It is still another object of the invention to provide films of polyarylsulfones which have useful dielectric properties.

In accordance with the above and other objects of the invention, I have prepared soluble, substantially linear condensation polymers consisting essentially of repeating units having the formula

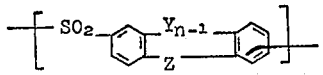

wherein Y is a linking moiety of the group consisting of —O—, and —S—, n is an integer having a value from 1 to 2, and Z is a member of the group consisting of

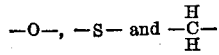

These polymers are of high molecular weight and form tough, flexible and orientable films and filaments of excellent physical properties. They can be extruded, drawn, oriented or otherwise formed into articles by conventional methods used to shape thermoplastic resins, without serious degradation; and the articles thus produced have a high degree of strength, toughness, flexibility and good appearance. They have excellent dielectric properties and retain these properties at high temperatures.

The polymers of the invention are thermoplastic and soften at relatively high temperatures. They melt at temperatures ranging from the order of 300° C. to over 450° C. without serious degradation. By heating for a period of time at a temperature below the melting point, or by orienting, crystallinity can be developed in a number of these polymers.

The new polymers are soluble in concentrations of 10% in phenol at 175° C., which indicates their substantially linear, non-crosslinked nature. They also are soluble in concentrated sulphuric acid and in N-methyl pyrrolidinone, producing stable solutions. Some of the polymers are also soluble in such solvents as N,N-dimethyl acetamide, dimethyl sulfoxide and the like. The solutions which result are in some instances useful for casting of films and spinning of fibers.

The stability of the polymers includes resistance to hydrolytic and oxidizing media. Thus, for example, the polymers may be recovered unchanged from their solution in concentrated sulphuric acid merely by dilution with water. They are resistant to oxidation when heated in air, as shown by the results of thermogravimetric analysis. Likewise, they can be heated under pressure in the presence of aqueous acids or bases without hydrolysis.

The toughness of thermoplastic materials is known to be an index of their utility for use as films or molded items. Toughness as a property can be measured by subjecting a film of polymer from 3 to 7 mils thick to repeated creasing by folding a strip of the film double and creasing, followed by refolding the film back upon itself on the same line and again creasing, as one cycle. The number of creasing cycles withstood by the film before breaking at the crease line is referred to as the "degree of toughness." Failure to withstand the initial creasing rates a degree of toughness of zero; if the film breaks on the second cycle, the degree of toughness is one, etc.

The heat resistance of a polymer can be determined by thermogravimetric analysis (often abbreviated TGA), i.e., measuring the loss and weight of the polymer while heating to high temperature. For example, a useful test is provided by simultaneously heating up and weighing a 100 mg. sample of the polymer in a suitable oven, in air, from ambient temperature to about 400–500° C., at the rate of 7° C. temperature increase per minute, to determine any weight loss. A weight loss of 5% or less in this test shows excellent stability of the polymer at the highest temperature used.

The polymers of the invention have various uses in numerous areas of application. They can be used to make films and fibers or molded articles in any desired shape, either alone or mixed with fillers, glass fibers, and the like. They are usefully laminated with glass fibers or glass cloth. They can also be used as adhesives or coatings, to impregnate the surface of various materials or to form a surface film thereon. They are useful as wire coatings, tubes, pipes, sheets and the like.

The polymers are particularly useful in applications where their high dielectric properties are of importance, as in electrical insulating materials, and particularly where severe and corrosive ambient conditions are found.

Broadly speaking, the polymers of the invention are produced by a condensation process, using Friedel-Crafts type catalysts, and various starting materials. One aspect of the process for producing the polymers in accordance with the invention consists in the condensation of aromatic monomers containing sulfonyl halide groups, with other monomers having aryl nuclei, in the presence of the said catalysts. In this case, the monomeric materials which are starting compounds for the reaction are difunctional, with respect to sulfonyl halide groups; i.e., two such reactive centers are present in the same aryl moiety. In carrying out the reaction, the halogen on the sulfonyl halide substituent reacts with a hydrogen atom of the comonomeric aromatic nucleus. The reaction is more specifically illustrated by the following series of equations:

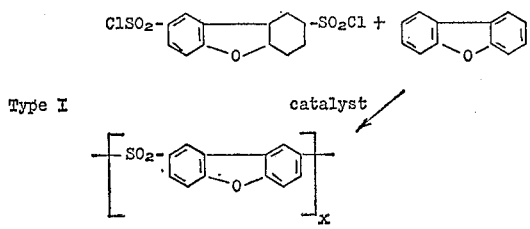

Chains of various lengths are formed, as is known; and $x$ is a number which is an average of the number of repeating units in these chains. In the case of the higher molecular weight polymers, $x$ is from about 50 to 250 or more.

Another type of condensation which produces the polymers of the invention employs monomers which are self-condensable, and is more specifically illustrated by the following reaction:

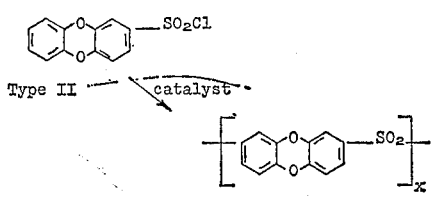

Comonomers useful in reactions of Type I are exemplified by diphenylene dioxide (i.e. dibenzodioxin), xanthene, thioxanthene, fluorene, dibenzothioxane, dibenzofuran, thianthrene, dibenzothiophene, and the corresponding disulfonyl chloride derivatives of those compounds, and the like. If desired, the aromatic, unsubstituted comonomer can differ from the sulfonyl halide-substituted comonomer, to produce copolymers.

Monomers of the type useful in the process illustrated by reaction II are exemplified by diphenylene dioxide monosulfonyl chloride, dibenzopyran monosulfonyl chloride, dibenzothioxane monosulfonyl chloride, 2-fluorene monosulfonyl chloride, 2-dibenzofuran monosulfonyl chloride, thianthrene monosulfonyl chloride, thioxanthene monosulfonyl chloride, dibenzothiophene monosulfonyl chloride, xanthene monosulfonyl chloride and the like. The corresponding sulfonyl bromides are also useful. Two or more of such monomers can be copolymerized.

The preparation of the sulfonyl halide-substituted monomers useful in the process of the invention is illustrated and exemplified by the descriptions in the following reports: Preparation of fluorenemonosulfonyl chloride, E. Wedekind et al., Chem. Berichte, vol. 56, page 1561 (1923); fluorenedisulfonyl chloride, G. Courtot, Compt. Rend., vol. 178, page 2259; dibenzothiophenesulfonyl chloride, G. Courtot et al., Compt. Rend., vol. 198, pages 2003, 2260 (1934); dibenzodioxindisulfonyl chloride, M. Tomita et al., Yakugaku Zasshi, vol. 80, page 796 (1960); dibenzothioxane mono- and disulfonyl chloride, W. V. Evans et al., J. Am. Chem. Soc., vol. 58, page 719 (1936).

The deactivating effect of the sulfonyl group on the aromatic ring to which it is or becomes attached is sufficient to prevent any significant amount of higher than monosulfone formation in any one ring. Branching and cross-linking are thus suppressed, and accordingly the polymers of the invention are substantially linear.

Any of the above monomers or comonomers can be further substituted with small non-reactive substituents on the aromatic nuclei. Thus, the aromatic nuclei may additionally bear alkyl and perfluoroalkyl groups such as methyl, ethyl, propyl, hexyl and the like; lower alkoxy groups such as methoxy, ethoxy, butoxy, etc.; halogen atoms such as chlorine or bromine, or other similar small substituents which are inert under the conditions of the poly condensation reaction.

The process for the preparation of the polymers of this invention, broadly speaking, is carried out utilizing either melt condensation or solution condensation procedures, involving the repeated reaction between an aromatic sulfonyl-chloride group and an aromatic hydrogen atom in the presence of a condensation catalyst.

It is generally preferred to utilize an inert solvent in carrying out the polymerization process in order to increase the fluidity of the reaction mixture. The preferred solvents are chlorinated aliphatic and aromatic hydrocarbons, e.g. s-tetrachloroethane, methylene chloride, and Arochlors (highly chlorinated biphenyl and diphenyl ether), etc. or aliphatic and aromatic sulfones such as dimethyl sulfone, tetramethylene sulfone, p,p'-dichlorodiphenylsulfone, etc., or aliphatic and aromatic nitro compounds, such as 1 - nitropropane, nitrobenzene, 3,4'-dichloronitrobenzene, etc.

Effective condensation catalysts are anhydrous Lewis acids, also known as Friedel-Crafts catalysts, such as ferric chloride, aluminum chloride, zinc chloride, the chlorides of antimony, etc. Anhydrous hydrofluoric acid, or trifluoromethane sulfonic acid also may be used as catalysts.

The particularly preferred catalysts are salts and oxides of iron, such as ferric chloride, ferric bromide, ferric fluoride and ferric oxide. Ferrous chloride, ferric sulfate, feroso-ferric oxide and the like also can be effectively utilized as catalysts because these compounds are converted into ferric chloride by reaction with the sulfonylchloride monomer under the conditions of the polymerization. The preferred catalysts are generally found to be effective in amount of from about 0.05 to about 0.5 mole percent, based on the amount of monomer present. Greater proportions of catalyst may be utilized but this is generally unnecessary and is ordinarily avoided, because larger amounts can adversely affect the degree of polymerization and the separation of the catalyst from the polymer may prove difficult.

To effect the polycondensation the monomers or comonomers are generally first heated in the presence of an inert solvent to a temperature sufficient to obtain a uniform melt. Commonly this is achieved at a temperature ranging from 100 to 200° C., although temperatures ranging from about 25° to 250° C. may be used. After a uniform melt is obtained, the condensation catalyst is added and the mixture is maintained at a temperature in the range of from 100 to 250° C. for from about one hour to twenty hours, to complete the polymerization. High molecular weight polyarylsulfones are produced in high yields in this manner as is shown by the examples which follow.

The following examples are intended to illustrate the present invention, but no limitations to the scope of the invention are implied. All parts are by weight, unless otherwise specified. Inherent viscosities of the polymers are determined in accordance with the following equation:

$$\eta_{inh.} = \frac{\ln \eta_{rel.}}{C}$$

The relative viscosity ($\eta_{rel.}$) is determined by dividing the flow time in a capillary viscometer of a dilute solution of the polymer by the flow time for the pure solvent. The concentration (C) is 1.0 gram of polymer per 100 ml. of solvent, and the measurements are made at a temperature of 25° C. in solution in a mixture of 60 g. of phenol and 40 g. of s-tetrachloroethane unless otherwise noted.

EXAMPLE 1

A charge of 100 g. of 2-dibenzofuran sulfonylchloride and 60 g. of dimethylsulfone was placed in a 500 ml. flask and heated to about 140° C. until a uniform melt had been formed. Sublimed ferric chloride (80 mg.) was then added and heating was continued for 15 hours at temperatures gradually rising to 180° C. and for an additional 6 hours at 210-225° C. The evolved hydrogen chloride gas was discharged to a water trap. The solid reaction product was ground up, dissolved in 700 ml. of hot N-methylpyrrolidone and precipitated in water. The precipitated poly(dibenzofuran sulfone) was recovered by filtration, washed twice with boiling water containing a small amount of hydrochloric acid and dried. The polymer showed a melting range of 410-440° C. The inherent viscosity of a 1% concentrated solution in a mixture of 60 g. phenol and 40 g. s-tetrachloroethane was 0.45. The X-ray diffraction pattern indicated a crystalline structure for the polymer. A transparent self-supporting film was formed by solvent casting or hot pressing between aluminum foil sheets. These films can be used as electrical insulators.

EXAMPLE 2

Dibenzodioxin monosulfonylchloride is prepared from dibenzodioxin with equimolar amounts of chlorosulfonic acid in chloroform medium and subsequent treatment at reflux temperature with excess thionylchloride containing 10% dimethylformamide. The dibenzodioxin monosulfonylchloride is purified by recrystallization from carbon tetrachloride and has a melting point of 92-93° C.

The polymer is prepared as follows:

Dibenzodioxin monosulfonyl chloride (50 g.) and dimethylsulfone (35 g.) was placed in a 250 ml. flask and heated to 130° C. to form a uniform melt. Then 50 mg. sublimed ferric chloride was added and the mixture was heated for 15 hours at temperatures rising from 130 to 160° and then for 5 hours at 200-210° C. The hydrogen chloride gas evolved during the polymerization was eliminated by a slow stream of nitrogen leading to a water trap. The solid reaction product was ground up and dissolved in 500 ml. of boiling phenol. The solution was filtered and poured into 2 l. of dimethylformamide. The poly(dibenzodioxin sulfone) separated as a crystalline precipitate. It was filtered, washed carefully with acetone and hot water and dried. The polymer showed a melting range of 350-370° C. and an inherent viscosity of 0.20 as a 1% concentrated solution in a mixture of 60 g. phenol and 40 g. s-tetrachloroethane.

Transparent films of the polymer are formed by hot pressing between sheets of aluminum foil at about 400° C. and quenching in cold water. Thse films have useful electrical insulation properties.

EXAMPLE 3

When fluorene, xanthene, dibenzo 1,4 - thioxane, dibenzo, 1,4-dithiane, and thioxanthene, respectively, are converted to the respective monosulfonyl chlorides, and each polymerized by the process of Example 2, there are obtained poly(fluorene uslfone), poly(xanthene sulfone), poly(dibenzo 1,4 - thioxane sulfone), poly(dibenzo 1,4-dithiane sulfone) and poly(thioxanthene sulfone).

The use of a mixture of equimolar amounts of the monosulfonyl chloride derivative of two aromatic compounds of this group produces a copolymer. Thus using a mixture of 100 g. of fluorene monosulfonyl chloride, about 100 g. of 2-dibenzofuran monosulfonyl chloride and about 100 mg. of ferric chloride yields a copolymer with randomly interspersed fluorene sulfone and dibenzofuran sulfone groups in the polymer chain.

Molding powders are readily prepared by grinding the polymers of the invention to the desired state of division. The powders thus obtained can be molded in heated molds at temperatures somewhat above the melting point and employing pressure as required, these methods being well-known to the art. If desired, adjuvants or additives can be incorporated into the molding powders, such as fillers, dyes, plasticizers and the like. The powders can be pelletized, if desired, to produce more easily handled, uniform pellets or granules.

The molded articles made from the polymers of the invention are strong and dimensionally stable, and, depending on the nature of the additives, if any, retain their good dielectric properties.

Fibers are conveniently prepared from the polymers by conventional methods. Thus, for example, a solution of the selected polymer in a solvent, preferably a solvent having moderately high vapor pressure, is extruded through a die or spinneret into a stack, where the solvent is evaporated. Remaining traces of solvent may be washed out of the fiber, if desired. Alternatively, the polymer can be melted and fibers drawn directly from a molten pool. Extrusion of fibers or filaments from the melt through a spinneret is more successful where large denier filaments are to be produced. Dyes, or viscosity lowering agents, can be incorporated into the polymer before extrusion.

The fibers thus produced can be drawn over a hot pin to orient them, with a resulting increase in strength and the development of crystallinity.

What is claimed is:

1. A thermoplastic, film- and fiber-forming condensation polymer consisting essentially of repeating units of the formula

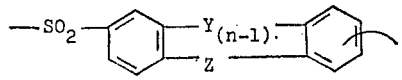

wherein Y is —O— or —S—, n is 1 or 2, and Z is —O—, —S— or —CH₂—.

2. Poly(dibenzofuran sulfone) according to claim 1.
3. Poly(fluorene sulfone) according to claim 1.
4. Poly(dibenzodioxin sulfone) according to claim 1.
5. Poly(xanthene sulfone) according to claim 1.
6. A film of thermoplastic condensation polymer according to claim 1.
7. A molding powder of thermoplastic condensation polymer according to claim 6.
8. A fiber of thermoplastic condensation polymer according to claim 6.
9. A film- and fiber-forming thermoplastic condensation polymer consisting essentially of repeating units of the formula

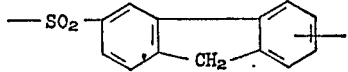

No references cited.

HAROLD D. ANDERSON, Primary Examiner

U.S. Cl. X.R.

117—161 R; 161—192; 260—30.2, 30.8 R, 32.6 R, 33.4 R, 37 R, 79.3 M; 264—176 F